OR 3,708,220

United States

Meyers et al.

[11] 3,708,220
[45] Jan. 2, 1973

[54] HIGH CONDUCTIVITY ELECTROLYTE GEL MATERIALS

[75] Inventors: Marion Douglas Meyers, Stamford; Thomas Anthony Augurt, Bridgeport, both of Conn.

[73] Assignee: American Cyanamid Company, Stamford, Conn.

[22] Filed: May 25, 1970

[21] Appl. No.: 41,155

[52] U.S. Cl. .............................................. 350/160 R
[51] Int. Cl. .................................................. G02f 1/28
[58] Field of Search ..................................... 350/160

[56] References Cited

UNITED STATES PATENTS

| | | | |
|---|---|---|---|
| 3,443,859 | 5/1969 | Rogers | 350/160 |
| 3,451,741 | 6/1969 | Manos | 350/160 |
| 3,453,038 | 7/1969 | Kissa et al. | 350/160 |
| 3,521,941 | 7/1970 | Deb et al. | 350/160 |
| 3,303,488 | 2/1967 | Anderson | 350/160 |
| 3,153,113 | 10/1964 | Flanagan et al. | 350/160 |

Primary Examiner—Ronald L. Wibert
Assistant Examiner—J. Rothenberg
Attorney—Charles J. Fickey

[57] ABSTRACT

An electro-optical device is provided which is useful in control of visible and infrared absorption by windows, data display devices and the like typically comprising in sandwich arrangement a pair of electrodes, and disposed therebetween, two identical layers of transition metal electrochromic compounds separated by a semi-solid highly conductive sulfuric acid gel electrolyte. The gel exhibits good conductivity, stability and compatibility with the electrochromic layers.

7 Claims, 7 Drawing Figures

INVENTORS.
MARION DOUGLAS MEYERS
THOMAS ANTHONY AUGURT
BY
Charles J. Fickey
ATTORNEY

HIGH CONDUCTIVITY ELECTROLYTE GEL MATERIALS

This invention is directed to electro-optical devices whose electromagnetic radiation transmission characteristics can be selectively altered by the influence of a suitably controlled electrical field. More particularly this device relates to a system comprising electrochromic materials and conductive electrolyte which exhibit good chemical and electrochemical stability, reversibility and reproducibility. Still more particularly this invention is concerned with a highly conductive sulfuric acid gel electrolyte which exhibits good chemical compatibility with the electrochromic materials and a wide range of desirable gel properties.

In prior copending commonly assigned U.S. applications, Ser. No. 530,086, filed Feb. 25, 1966, refiled as Ser. No. 616,791 Feb. 14, 1967, refiled as Ser. No. 110,068 Jan. 27, 1971, and Ser. No. 534,188, filed Mar. 14, 1966, refiled as Ser. No. 616,790 Feb. 17, 1967, refiled as Ser. No. 120,365 Mar. 2, 1971, and continuation-in-part applications thereof, there are described electro-optical devices exhibiting a phenomenon known as persistent electrochromism.

The term persistent electrochromism denotes the property of a material whereby its electromagnetic radiation absorption characteristic is altered, in most instances even at ambient temperature, under the influence of an electric field. Such materials, for example, may exhibit little or no absorption of visible wave lengths in the absence of an electric field and therefore be transparent, but when subjected to an electric field, effectively absorb in the red end of the spectrum, turning blue in color. Similar effects can be observed in other portions of the electromagnetic radiation spectrum, invisible as well as visible.

As described in the foregoing earlier applications, if a layer of a persistent electrochromic material is disposed between a pair of electrodes, across which a potential is applied, the radiation transmitting characteristic of the material will change. If the electrodes and the electrochromic layer are formed on the surface of a transparent substrate, such as glass, the light transmitting characteristics of the combination can be varied by controlling the electric field produced across the electrochromic material. On the substrate which originally is clear, i.e., presenting substantially no diminution of the light transmitting ability of the substrate, application of a voltage between the electrodes to establish an electric field of the proper polarity changes the light absorption characteristic of the electrochromic material, turning it darker, for example, thus decreasing the light transmitting ability of the entire assembly.

In U.S. Pat. No. 3,357,930 it has been proposed to form electrically conductive transparent coatings from combination of salts in a polymeric matrix. However, these compositions suffer the disadvantage of relatively low electrical conductance insufficient to meet the stringent conductivity requirement of electrochromic device of the present invention wherein he gel must have a conductivity approaching 4M $H_2SO_4$.

In later developments in this area, (copending, commonly assigned applications Ser. No. 41,154, filed May 25, 1970, and Ser. No 41,153, filed May 25, 1970, are described devices which employ liquid or semi solid conducting media such as liquid sulfuric acid, or lithium stearate greases. Although these devices are effective to change their electromagnetic radiation transmitting properties under the influence of an electric field the simple combination of electrodes, electrochromic materials and electrolyte was somewhat limited in application because in some cases the semi solid conducting greases were insufficiently electrically conductive to permit device operation at voltages below the decomposition potential of the electrolyte to avoid undesirable electrochemical side reactions. Similarly the use of a strong liquid sulfuric acid electrolyte while sufficiently conductive to permit low voltage operation was however not chemically compatible to prevent chemical attack on certain electrode materials such as porous lead, moreover, the liquid electrolyte had the disadvantages of containment inherent in a fluid.

The shortcomings described above have been overcome in the present invention by the unexpected stability of certain gelled, sulfuric acid - polymeric electrolytes such as $H_2SO_4$- PVA (polyvinyl alcohol) which possess high electrical conductivity and good chemical compatibility with the electrochromic films employed in the present device. In addition these gel electrolytes possess good stability, high viscosity and transparency. Further, the ease of device manufacture is facilitated by improved dimensional stability and self sealing characteristic of the sulfuric acid polyvinyl alcohol gel employed.

SUMMARY OF THE INVENTION

An object of the present invention therefore is to provide an improved form of electrochromic device wherein a highly conductive gel electrolyte is employed which is chemically stable and compatible with electrochromic films so as to permit highly stable, reversible and reproducible operation at low potential.

Briefly stated the present invention modifies the prior electrolyte-electrochromic material sandwich by substituting a stable and highly conductive semi solid sulfuric acid-polyvinyl alcohol gel between electrochromic films of the same material. It has been found that when such a material is added to the prior device not only does it exhibit markedly improved ionic conductivity with a semi-rigid conducting media but also shows unexpected chemical and electrochemical advantages for the electrochromic material-conductive gel combination. In certain cases the properties of the gel may be varied by using other grades of polyvinyl alcohol, different sulfuric acid concentrations and different polyvinyl alcohol to acid ratios.

The stability and conductivity of the gel, its compatibility with the electrochromic material and the lower voltage at which the coloration and bleaching can be effected are improved in relation to the embodiments of the earlier disclosures, Ser. No. 41,154 and 41,153. Thus the present invention is particularly applicable to a much wider range of use such as to mirrors, windows, data displays and the like. Moreover, the field of practical use is widened by the ability to vary the gel properties over a wide range of desirable characteristics.

The foregoing and other features, objects and advantages of the present invention will become more apparent from he following detailed description.

As used herein, a "persistent electrochromic material" is defined as a material responsive to the application of an electric field of a given polarity to change from a first persistent state in which it is essentially non-absorptive of electromagnetic radiation in a given wave length region, to a second persistent state in which it is absorptive of electromagnetic radiation in the given wave length region, and once in said second state, is responsive to the application of an electric field of the opposite polarity to return to its first state. Certain of such materials can also be responsive to a short circuiting condition, in the absence of an electric field, so as to return to the initial state.

By "persistent" is meant the ability of the material to remain in the absorptive state to which it is changed, after removal of the electric field, as distinguished from a substantially instantaneous reversion to the initial state, as in the case of the Franz-Keldysh effect.

DETAILED DESCRIPTION OF THE INVENTION

Electrochromic Materials

Figure 1:
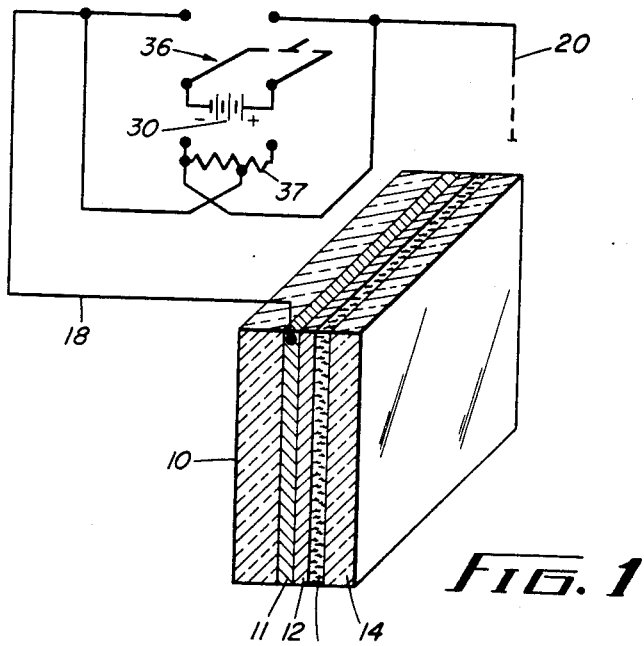

The materials which form the electrochromic materials of the device in general are electrical insulators or semi-conductors. Thus are excluded those metals, metal alloys, and other metal-containing compounds which are relatively good electrical conductors.

While not wholly understood, it appears that coloration of the electrochromic materials must be accompanied by the uptake of positive counterions provided in the electrolyte.

The persistent electrochromic materials are further characterized as inorganic substances which are solid under the conditions of use, whether as pure elements, alloys, or chemical compounds, containing at least one element of the Periodic System which can exist in more than one oxidation state in addition to zero. The term "oxidation state" as employed herein is defined in "Inorganic Chemistry," T. Moeller, John Wiley & Sons, Inc., New York, 1952. These include materials containing a transition metal element (including Lanthanide and Actinide series elements), and materials containing non-alkali metal elements such as copper. Preferred materials of this class are films of transition metal compounds in which the transition metal may exist in any oxidation state from +2 to +8. Examples of these are: transition metal oxides, transition metal oxysulfides, transition metal halides, selenides, tellurides, chromates, molybdates, tungstates, vanadates, niobates, tantalates, titanates, stannates, and the like. Particularly preferred are films of metal stannates, oxides and sulfide of the metals of Groups (IV)B, (V)B and (VI)B of the Periodic System, and Lanthanide series metal oxides and sulfides. Examples of such are copper stannate, tungsten oxide, cerium oxide, cobalt tungstate, metal molybdates, metal titanates, metal niobates, and the like.

Additional examples of such compounds are the following oxides: MO oxides (M representing the metal ion), e.g., MnO, NiO, CoO, etc.; $M_2O_3$ oxides, e.g., $Cr_2O_3$, $Fe_2O_3$, $Y_2O_3$, $Yb_2O_3$, $V_2O_4$, $Ti_2O_3$, $Mn_2O_3$, etc.; $MO_2$ oxides, e.g., $TiO_2$, $NnO_2$, $ThO_2$, $CrO_2$, etc.; $M_3O_4$ oxides, e.g., $Co_3O_4$, $Mn_3O_4$, $Fe_3O_4$, etc.; $MO_3$ oxides, e.g., $CrO_3$, $UO_3$, etc.; $M_2O_5$ oxides, e.g., $V_2O_5$, $Nb_2O_5$, $Ta_2O_5$, etc.; $M_4O_6$ oxides; $M_2O_7$ oxides such as $M_2O_7$; complex oxides such as those of the formula $XYO_2$ (X and Y being different metals), e.g., $LiNiO_2$, etc.; $XYO_3$ oxides, e.g., $LiMnO_3$, $FeTiO_3$, $MnTiO_3$, $CoTiO_3$, $NiTiO_3$, $LiNbO_3$, $LiTaO_3$, $NaWO_3$, etc.; $XYO_4$ oxides, e.g., $MgWO_4$, $CdWo_4$, $NiWO_4$, etc.; $XY_2O_6$, e.g., $CaNb_2O_6$ ("Niobite" oxides); $X_2Y_2O_6$, e.g., $Na_2Nb_2O_6$: Spinel structure oxides, i.e., of the formula $X_2YO_4$, e.g., $NaMoO_4$, $Ag_2MoO_4$, $Cu_2MoO_4$, $Li_2MoO_4$, $Li_2WO_4$, $Sr_2TiO_4$, $Ca_2MnO_4$, etc.; and $XY_2O_4$, e.g., $FeCr_2O_4$, $TiZn_2O_4$, etc.; $X_2YO_5$ oxides, e.g., $Fe_2TiO_5$, $Al_2TiO_5$, etc. For a discussion of some complex oxides, see Advanced Inorganic Chemistry, Cotton & Wilkinson, p. 51, (1966), Interscience Publishers, Inc., New York and Progress in Inorganic Chem., Vol. 1, 465 (1959) Interscience Publishers, Inc., New York. Also included are nitrides, and the sulfides corresponding to the above oxides. Hydrates of certain metal oxides may also be used, e.g., $WO_3 \cdot H_2O$, $WO_3 \cdot 2H_2O$, $MoO_3 \cdot H_2O$ and $MoO_3 \cdot 2H_2O$.

The preferred electrochromic material for use with the semi-solid electrolyte of the present invention is a compound which contains at least one element selected from Group VA, VIA, VIIA of the Periodic Table of the elements and at least one cation from Groups IB, IIB to VIIIB including Lanthanide and Actinide series. Particularly advantageous materials are $WO_3$ and $MoO_3$.

An important advantage of devices of the invention containing a stable sulfuric acid gel electrolyte in contact with electrochromic material is applicability to large uniformly colored areas. The invention, therefore, permits numerous practical applications where control of visible and infrared absorption is desired to which prior art electrooptical devices are not susceptible as for example windows in homes, commercial buildings and automobiles.

When the persistent electrochromic materials are employed as films, thickness desirably will be in the range of from about 0.1–100 microns. However, since a small potential will provide an enormous field strength across very thin films, the latter, i.e., 0.1–10 microns, are preferred over thicker ones. Optimum thickness will also be determined by the nature of the particular compound being laid down as films and by the film-forming method since the particular compound and film-forming method may place physical (e.g.; non-uniform film surface) and economic limitations on manufacture of the devices.

The films may be laid down on any substrate which, relative to the film, is electrically non-conducting. Suitable substrate materials include glass, wood, paper, plastics, plaster, and the like, including transparent, translucent, opaque or other optical quality materials. A preferred embodiment in the instant device would employ at least one transparent electrode.

When the electric field is applied between the electrodes, a blue coloration of the previously transparent sandwich occurs, i.e., the persistent electrochromic layer becomes absorptive of electromagnetic radiation over a band encompassing the red end of the visible spectrum, thereby rendering it bluish in appearance. Prior to the application of the electric field, it was essentially non-absorbent and thus transparent.

ELECTROLYTE

A semi-solid conductive electrolyte gel is employed. The electrolyte comprises in combination with sulfuric acid a gelling material for the acid. Any gelling agent which is compatible with the electrochromic layer is suitable. Particularly advantageous gelling agents are polyvinyl alcohol, polyacrylamide, ethylene glycol, sodium silicate, cabo-sil, and the like.

A thickening agent such as Purifloc A21 may optionally be employed.

A preferred embodiment employs $H_2SO_4$ in combination with polyvinyl alcohol. The properties of this gel may be varied in advantageous manner by employing polyvinyl alcohol of various molecular weights, differing sulfuric acid concentration and different polyvinyl alcohol to acid ratios. Thereby gel electrolytes can be produced to give a specific conductivity in the range of from about 0.10 to 0.60 $ohm^-cm^{-1}$.

A distinct advantage of the above mentioned gel electrolytes is their high ionic conductivity and good chemical stability. We have found that both requirements are unexpectedly met by gels in the preferred conductivity range of $0.20 - 0.40$ $ohm^{-1} cm^{-1}$.

Other materials may be incorporated into the gel to vary the physical properties of the gel such as viscosity and vapor pressure. Thus the composition may optionally include organic solvents such as, dimethyl formamide, acetonitrile, proprionitrile, butyrolactone and glycerine.

Further, the gels used in the instant invention may be made opaque with, for example, polyhydric phenols such as gallic acid for use in certain electrochromic display device applications.

COUNTER ELECTRODE

If the cell is to be used as a light transmission modulating device, it employs at least one transparent electrode and a second counter electrode in contact with the solution. The latter electrode is one selected from a group of materials compatible with the electrolyte, as previuosly discussed, such as tungsten oxide or molybdenum oxide. It is advantageous to use the same material for both electrodes, although not necessary. In a preferred embodiment of the present invention tungsten oxide counter electrode is employed in contact with the electrolyte.

The invention may be better understood by reference to the drawings which show embodiments of the invention.

Figure 2:
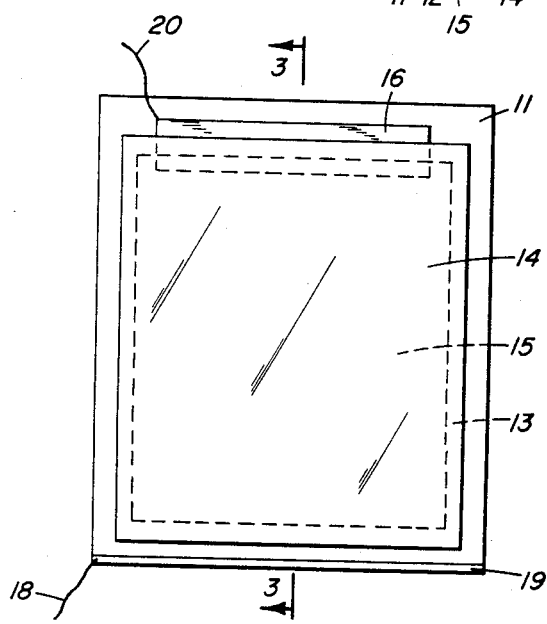
Figure 3:
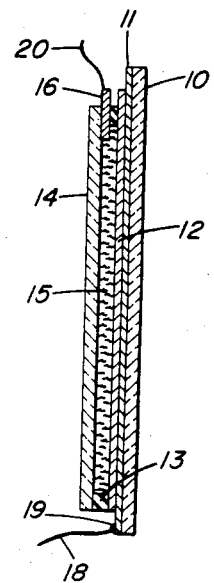
Figure 4:
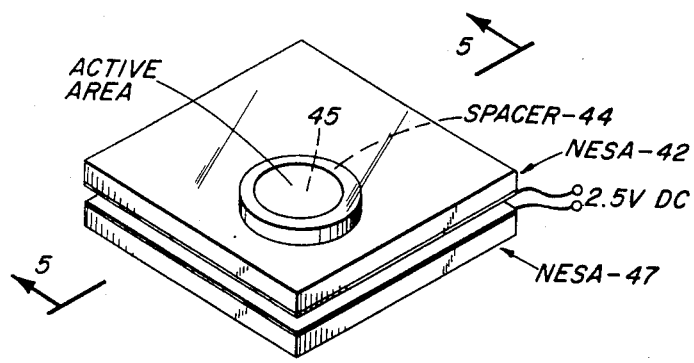
Figure 5:
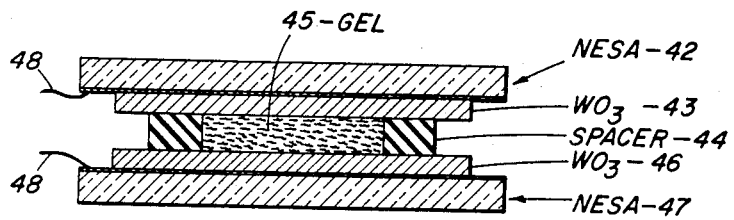
Figure 6:
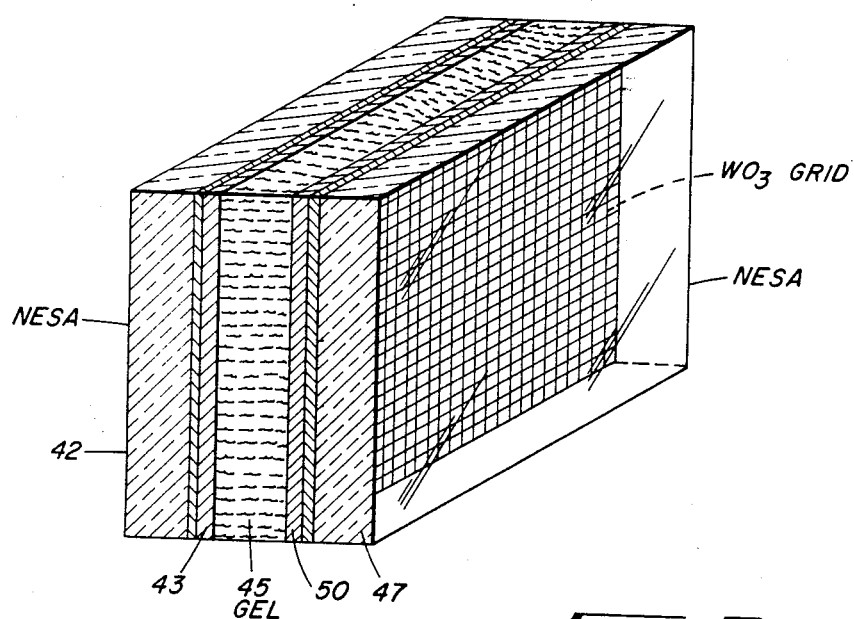
Figure 7:
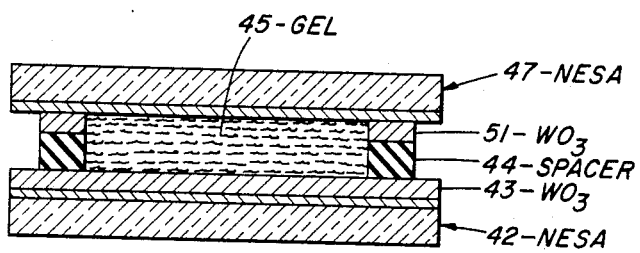

FIG. 1 is a cross-sectional view in part of an electrochromic device of the invention, showing the connecting electrical power circuit, FIG. 2 is a plan view of the device of FIG. 1, FIG. 3 is a cross-sectional view of taken along the lines 3—3 of FIG. 2, showing the complete device of FIG. 1, FIG. 4 is a view of an alternative embodiment of the inventive electrochromic device having a planar counter-electrode, FIG. 5 is a cross-sectional view taken along the lines 5—5 of FIG. 4, FIG. 6 is a partial cross-sectional view of an alternative embodiment with a grid counter-electrode, FIG. 7 is a partial cross-sectional of a device view with a counter electrode in the border of the device.

With reference to FIG. 1, 10 is a substrate or backing material overlaid with a first electrode 11. The substrate 10 and the conductive layer 11 may conveniently be provided as a unit by so-called "NESA"-glass, a commercially available product having a transparent coating of conductive tin oxide layer 11, deposited on glass. On the NESA glass, is deposited a layer of a persistent electrochromic material 12 for example by vacuum evaporating tungsten oxide to form a film 12 of thickness in the range of about 1 micron. Overlaying and in contact with film 12 is a gasket 13 formed from an electrically insulating material. As shown in FIGS. 2 and 3 the gasket 13 separates the film 12 from a glass cover plate 14 and produces a space for the gel electrolyte 15. In the end of the electrolyte chamber is a tungsten oxide counter electrode 16.

Contact to an external potential is secured by lead 18 from a conductive strip 19 over the tin oxide layer 11 of the conducting glass, and lead 20 to counter electrode 16. A source of dc potential 30 is coupled between the conductive films with its positive terminal connected to the metallic strip 19 and its negative terminal connected to the tungsten oxide counter electrode 16.

Turning now to drawing, FIG. 4 a plan view of another arrangement of the device of the present invention showing an electrochromically active center area and the external electrical leads is illustrated.

The components of the sandwich device are shown in cross section in FIG. 5. The outermost layers 42 and 47 consist of two pieces of transparent substrate containing on their inner surface an electrically conductive coating. The substrate and conductive layer may conveniently be provided as a unit by so-called "NESA" glass, a commercially available product having a transparent coating of conductive tin oxide on one surface of the glass as described previously. Deposed thereon and in contact with each conductive tin oxide layer are separate evaporated films of tungsten oxide 43 and 46 each about 1 micron in thickness. Between and in contact with both tungsten oxide films there is disposed a center portion of an opacified gel 45 about 3 mm in thickness enclosed by a circular insulating spacer 44. Electrical contact of the device to the external potential is accomplished by soldered electrical wire connections 48 and 49 from the NESA conductive layers. The electrical pathway through the cell is from one tungsten oxide layer, through the conductive electrolyte gel to the other tungsten oxide layer. Because of the arrangement of the two electrochromic films in opposed relationship the arrangement shown in FIGS. 3 and 4 permits the display of only one electrochromic layer at a time.

FIG. 6 shows a geometric arrangement of the device applicable as a window wherein one electrochromic layer 50 is fabricated in the form of a grid with a high percent transmission even when the material is in the colored state.

Alternatively FIG. 7 shows an embodiment wherein the electrochromic counter electrode layer 16 is concealed in the frame of a window so as not to interfere with optical transmission.

The following examples illustrating particular applications of the present invention are not to be construed as a limitation of the invention except as defined in the appended claims.

EXAMPLE 1

A film of tungsten oxide about 1.0 micron in thickness is vacuum deposited on two electronically conductive NESA glass plates. The plates were assembled in a sandwich arrangement in which the tungsten oxide layers were positioned opposite and in face to face arrangement in a cell cavity provided by a 2 mm spacer. A suitably conductive gel was provided by sulfuric acid - polyvinyl alcohol. The gel preparation comprises the addition of 20 ml of 3M $H_2SO_4$ to 5.5 gm of polyvinyl alcohol (DuPont Elvanol 70-05) at a temperature of 80° C. A clear viscous solution is formed within about 15 minutes. During this period the mixture is stirred constantly and the temperature is held at about 80°–85° C. The solution is cooled to room temperature while centrifuging to remove bubbles.

The clear liquid is poured into the empty cell cavity through one port while providing an additional port as an outlet for the displaced air. The gel exposed at the entrance port hardens in contact with air thereby providing self seal and antileak features.

The gel exhibited a conductivity of 0.30 $ohm^{-1}$ $cm^{-1}$ and unexpected clarity on storage. The cell underwent 5,000 cycles over a period of 20 days. The film remained transparent and the device showed no change in voltage - time curves.

EXAMPLE 2

The procedure of Example 1 was repeated in every detail except for employing 4M sulfuric acid and 20 DuPont Elvanol 70-05 to form a gel with conductivity of 0.35 $ohm^{-1}$ $cm^{-1}$. The cell was submitted to 6,000 cycles of continuous cycling at voltage of 0.7V.

| Ex. | Gel Composition | Gel Conductivity ohm cm | Cell Voltage (Volts) | Number Cell Cycles |
|---|---|---|---|---|
| 3 | 3M $H_2SO_4$ 30% Elvanol 70–05 | 0.19 | 0.8 | 5000 |
| 4 | 4M $H_2SO_4$ 13% PVA 125 | 0.33 | 0.7 | 10,000 |
| 5 | 5M $H_2SO_4$ 13% PVA 125 | 0.37 | 0.8 | 7500 |
| 6 | 8M $H_2SO_4$ 40% Elvanol 70–05 | 0.25 | 1.0 | 8000 |

In the foregoing examples all cells were in original condition after the number of cycles specified.

We claim:

1. A variable light transmission device comprising a layer of a persistent electrochromic material, said material having its optical absorption alterable by addition or removal of electrons, in contact with a layer of a semi-solid electrolyte gel, said gel and electrochromic material being between a pair of electrodes.

2. A variable light transmission device, as in claim 1, which comprises a laminate of at least two layers of said persistent electrochromic material separated by a semi solid electrolyte gel disposed between said pair of conductive electrodes.

3. The device of claim 1 wherein said semi-solid electrolyte is a sulfuric acid-polyvinyl alcohol gel.

4. The device of claim 1 wherein said gel electrolyte has a conductance of at least that of 4M $H_2SO_4$.

5. The device of claim 2 wherein said gel is in face to face electrical contact with two separate but identical films of tungsten oxide.

6. The device of claim 2 wherein at least one of said electrodes is substantially transparent.

7. The device of claim 1 wherein said persistent electrochromic material is tungsten oxide.

* * * * *